(12) United States Patent
Bissinger et al.

(10) Patent No.: US 7,712,897 B2
(45) Date of Patent: May 11, 2010

(54) VARIFOCAL LENS

(76) Inventors: Martin Bissinger, Jahnstr. 21, 96050 Bamberg (DE); Roman Sturm, Nordring 76, 90409 Nürmberg (DE); Thorsten Stein, Michaelsberger Weg 23, 96135 Stegaurach (DE)

(*) Notice: Subject to any disclaimer, the term of this patent is extended or adjusted under 35 U.S.C. 154(b) by 302 days.

(21) Appl. No.: 11/569,542

(22) PCT Filed: May 25, 2005

(86) PCT No.: PCT/EP2005/005675

§ 371 (c)(1),
(2), (4) Date: Nov. 22, 2006

(87) PCT Pub. No.: WO2005/119346

PCT Pub. Date: Dec. 15, 2005

(65) Prior Publication Data

US 2007/0222943 A1    Sep. 27, 2007

(30) Foreign Application Priority Data

May 26, 2004    (DE) .................. 10 2004 025 712

(51) Int. Cl.
*G02C 7/06* (2006.01)
(52) U.S. Cl. .................. 351/169; 351/177; 351/168
(58) Field of Classification Search .................. 351/169
See application file for complete search history.

(56) References Cited

U.S. PATENT DOCUMENTS

| | | | |
|---|---|---|---|
| 3,623,800 A * | 11/1971 | Volk | 351/169 |
| 4,580,883 A | 4/1986 | Shinohara | |
| 4,592,630 A | 6/1986 | Okazaki | |
| 4,995,715 A * | 2/1991 | Cohen | 351/161 |
| 5,880,810 A | 3/1999 | Altheimer et al. | |
| 6,199,984 B1 | 3/2001 | Menezes | |
| 6,474,814 B1 | 11/2002 | Griffin | |
| 7,063,422 B2 | 6/2006 | Lindacher | |

* cited by examiner

*Primary Examiner*—Jessica T Stultz
(74) *Attorney, Agent, or Firm*—24IP Law Group; Timothy R. DeWitt

(57) ABSTRACT

A method for constructing a progressive varifocal lens having a far vision area, a near vision area and an intermediate progression area. the method comprises the steps of a) determining the x- and y-coordinates of a first point in the closed interval between the far vision reference point of the far vision area and the center point; b) determining the x and y coordinates of a second point as the near vision reference point of the near vision area; c) determining a mathematical function D(y) which obeys the following conditions: it contains the first and second points as local extrema and comprises exactly one point of inflection in the open interval between the two points; distributing the addition according to the said function along a principal meridian of progression connecting the first and second points; and d) forming the varifocal lens.

10 Claims, 4 Drawing Sheets

VARIFOCAL LENS

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention concerns generally progressive varifocal lenses, which during the last years have mainly replaced so called bi-focal lenses having a clearly zoned near vision area and a area which otherwise is dedicated for the far vision. Especially, the invention concerns so called individual varifocal lenses, but is not limited thereto.

2. Brief Description of the Related Art

Progressive varifocal lenses are known for several years and comprise in usual manner an area dedicated to the far vision in the above section of the lens, and an area dedicated for the near vision, for example for reading, in the lower section of the lens. Between these two areas, there is the so-called progression zone, in which the mean sphere varies. Both, when designing as well as when describing such lenses, reference is usually made to a far vision reference point, situated in the far vision area, as well as to a near vision reference point or control point, wherein at the said points the respective optical effect in diopters for correcting the ametropia of the wearer is dominant. The two reference points or points of reference are positioned on a so-called main progression meridian, along which the increase of addition takes place. The principal meridian of progression is usually defined based on surface properties as a line proceeding approximately between the 0.5 iso-astigmatism lines of a non-prescription progressive surface. Sporadically, it is also called umbilical line or line of main view, and therefore practically usually coincides with the respective penetration points of the view of a wearer, when he moves his eyes when changing from near vision to far vision and vice versa. At least this is intended when designing varifocal lenses.

In case of the varifocal lenses which are presently available on the market, either in a first step, a surface design is developed, and based on specific surface properties a whole lens family having respective matches of bases and addition values is produced. The optician then chooses the most suitable lens for the wearer, depending on the prescription, and if necessary, carries out a respective adaptation of the lens for the specific needs of the wearer.

As an alternative to the before mentioned varifocal lens families, increasingly frequently so-called individual varifocal lenses are used, which means as much as that for each respective one wearer of lenses, according to physiological data, a varifocal lens is designed and manufactured.

In both cases, it is possible to use one of the surfaces for the provision of the progressive or varifocal surface, and the other surface, for the provision of the spherical and/or torical correction, wherein it alternatively is also possible to provide both corrections at one and the same side, or to distribute the progression to both surfaces, or to combine a progressive surface with a regressive one.

Irrespective the fact, whether the design and manufacturing of a complete lens family or an individual varifocal lens is concerned, extremely complex mathematical calculations, especially calculations of surfaces, are necessary. Details concerning this context may especially be found in the work of Heinz Diepes and Ralf Blendowske "Optik und Technik der Brille", published in 2002 by the Optische, Fachveröffentlichung GmbH, Heidelberg. There, besides others, is described the common practice for the design and structuring' of varifocal lenses, whereupon the x and y coordinates of a first point are determined in the closed interval between the far vision reference point of the far, vision area and the so-called center point or control point of the lens, whereafter/whereupon the x and y coordinates of a second point are determined as the near vision reference points of the near vision area. As soon as these two points have been defined, one tries to determine a mathematical function to determine a preferably linearly ascending means sphere value, wherein the transition to the respective far vision area(s) and near vision area(s), in which the surface related refractive power or mean sphere does not change anymore, should be effected preferably in a most harmonical manner. Stated differently, one tries to determine a mathematical function which comprises the respective end points as local extremas, and preferably only possesses one single point of inflection between the two points. This approach usually, and as described in the above named work, is approximated by a polynom of third order, which is determined by defining boundary conditions.

Alternatively to the mathematical description, but with adequate result, so-called spline functions may be used as well. In each case, every variation of the lens, i.e. when designing a complete family of varifocal lenses or when providing an individualized varifocal lens requires a considerable demand of calculation to be able to calculate the complete free surfaces, in order to be able to provide, as is common, a preferably homogeneous distribution of the surface's astigmatism or cylinder and of respective vision fields in the vicinity of the" intermediate area and in the far vision area, after setting respective weights or evaluations.

In order to reduce the above named amount of calculation, in Patent EP-B1 0969309 was further proposed to base the proceeding of the principal meridian of progression on an approximation formula, when designing varifocal lenses. According to the disclosure of this patent pamphlet, for the offset $X_0$ of the main line projected into the x/y plane is defined: $x_0(y)=b"+a"-a":(1+e^{c(y+d)})$, wherein for the coefficients is: $2 \leq a" \leq 4.3$ mm; $0.03 \leq b" \leq 0$ mm; $-0.4 \leq c \leq -0.3$ mm$^{-1}$; $4.5 \leq d \leq 5.1$ mm.

SUMMARY OF THE INVENTION

In view of the considerable demand of complex calculations as stated above, it is an aim of the present invention to provide a method to drastically reduce the necessary effort of calculation when designing, structuring and manufacturing varifocal lenses.

A further aim of the present invention is to provide a varifocal lens, or to provide a family of varifocal lenses, respectively, which may be designed and formed in a physiologically compatible and cost effective and effectively designed manner. These aims are solved, according to the invention, by means of a method and a varifocal lens as described in the independent claims, as well as in the product by process claim; preferred embodiments are subject of the independent claims.

Especially, the present invention proposes a method for constructing a progressive varifocal lens having a far vision area, a near vision area and an intermediate progression area, wherein the method, in an as such common manner, comprises the steps: a) determining the x-and y-coordinates of a first point in the closed interval between the far vision reference point of the far vision area and the center point; b) determining the x and y coordinates of a second point as the near vision reference point of the near vision area; c) determining a mathematical function D(y) which obeys the following conditions: it contains the first and second points as local extrema and comprises exactly one point of inflection in the open interval between the two points; distributing the addition according to the said function along a principal meridian of progression connecting the first and second points; and d) forming the varifocal lens. A respective method arises to the skilled artisan from the above named work of Heinz Diepes and Ralf Blendowske "Optik und Technik der Brille" and is presented in the preamble of claim 1. Completely in contrary to the common technique to determine the optimum progression of the ascending of addition by means of splines or polynomial approximation, according to the invention is proposed to use basically an even-numbered power of a trigonometric function, especially a sine-square-function in the interval 0 to $\pi/2$. The chosen function is of course to be scaled accordingly on the involved interval and to be adjusted to the respective intended range of values. The surprising use of a trigonometric function, which means a circle function, in an extremely surprising manner obeys a physiologically beneficial proceeding of progression, wherein the surface calculation is considerably simplified, on account of the versatile, trigonometric theorems which, on the one hand, allow for a simple re-formulating, and on the other hand allow for a simple representation of derivative functions. By means of the choice of the power of the trigonometric function, is substantially determined the slope of the approximately linear part, so that, in an especially simple manner, personal preferences of the spectacle wearer may be accounted for.

BRIEF DESCRITION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1:
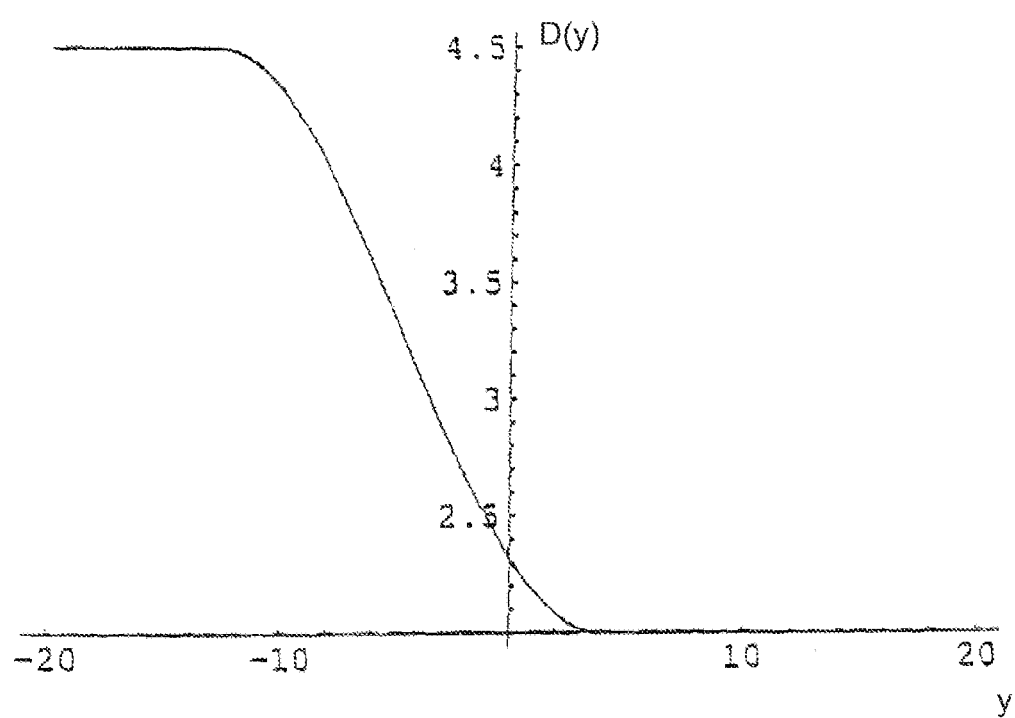
FIG. 1 represents a preferred proceeding of effect for a lens having a sphere of +2 diopters and an addition of 2.5.

According to a preferred embodiment, the gradient of the mean sphere or the surface related refractive power is practically 0 in the interval between the far vision reference point of the far vision area and the center point. To be stated differently, according to a preferred embodiment, the far vision area is practically continued downwards to the center point, wherein, in as such common manner, the far vision reference point may be positioned about 8 mm above the geometric middle of the lens, whereas the center point may be positioned about 4 mm above the geometric center of the lens, wherein the geometric middle of the lens is considered as the origin for the present coordinate system used.

Preferably, the x coordinates in step a) are determined on the basis of the x coordinates of step b), and depending on physiological data of the wearer, wherein, alternatively, the coordinates determined in the step b) are determined with respect to those that were determined in the step a), and depending on physiological data of the wearer. Now, the choice, whether the coordinates of the first point or that of the near vision reference point are determined depending on the respective other coordinates significantly depends on to which area, which means of the far vision or of the near vision, shall be assigned greater weight. As is especially preferred in case of individual varifocal lenses, usually the so called horizontal centering with respect to the far vision will be carried out, and accordingly, the coordinates of the near vision area and especially of the reference point thereof will be determined depending on the positioning of the far vision area and especially of the far vision reference point or of the positioning cross, respectively. The further incorporated physiological data may especially be the pupil distance and/or the turning point vertex distance of the wearer. When designing individual varifocal lenses, respective individual measurements are carried out, while when designing so called varifocal families, usually physiological average parameters are used, as they may be determined by means of clinical extensive tests.

The method according to the invention leads to especially favorable results, if the x coordinates of the line connecting the first and second points are determined by using an equation based on an even potentiated of a trigonometric function, especially a sine square function in the interval 0 to $\pi/2$ and contains physiological data of the wearer as parameters. As for the determining of the proceeding of the progression as well, trigonometric functions, also called circle functions, present the advantage to be easily scaleable, to provide a good approximation to spherical or also aspherical surface sections which are relevant here, to be continuously differentiable also up to high orders, so that respective free surfaces can be provided, the case being, also by means of re-formulating.

Also, when determining the proceeding of the main progression meridian, the preferred parameters are given in form of physiological data of the wearer as pupil's distance and/or turning point vertex distance, i.e., to the one hand, they comprise physiological data which can be caused ergonomically, and, on the other hand, physiological data which may be caused, by behavior-related technology, namely how a certain wearer usually will put on a certain frame.

The method according to the invention may especially in case of the constituting of individual varifocal lenses be optimized in the respect that the y coordinates of the first and/or the second point are determined, taking into consideration the turning point vertex distance and/or the ratio eye-movement to head-movement of the wearer when changing between far vision and near vision. It is generally known that different spectacle wearers show a different carrying behavior for spectacles with respect to the arranging of the frame on the nose, as also with respect to the degree of head movement or the eye movement, respectively, when changing between far vision area and near vision area and vice versa. When providing a complete varifocal lenses family, it is often distinguished, for example, between two basic shapings, on the one hand for so called eye-movers, and on the other hand for so called head movers. The ratio between inclination of head to eye movement is also significantly determined by the experience of vision through varifocal lenses, since usually a long year user of varifocal lenses will more likely tend to use the eyes than to perform a head movement when changing from far vision to near vision or vice versa. In this context as well, the chosen trigonometric function as a basis, especially in even power, for example in form of sine square, shows to be especially advantageous, since the function, for example for providing a shorter progression length, is simply shrunk, whereas it is stretched in case of a long progression length.

Essential for the method according to the invention is, at last, the surprising insight, that when designing the lenses with respect to the proceeding of the progression, in the optical as well as in the geometrical sense, is especially easily adaptable, if a respective circle function or trigonometric function in even power is used. Although it could not yet be concludingly determined, whether this special applicability of an even power of a trigonometric function is founded on the fact that a circle function is concerned, so that a simple adaptation to the spherical sectional surfaces or aspherical sectional surfaces is made possible, or is caused in that the trigonometric functions are especially well suited for constituting of angular dependencies of beam optics, remains to determine, that the especially resulting advantage consists in the easy mathematical handling ability, so that respective derivative functions, for example for determining the respectively dominant surface astigmatism, may be determined in an especially easy manner, and, thereby, with reduced computational effort.

Besides the lenses which already can be obtained by means of the method according to the invention, the invention also proposes varifocal lenses which are especially comfortable to the wearer, and on the other hand allow for an easy calculating and constituting. To this end, according to the invention is proposed a progressive varifocal lens having a far vision area comprising a far vision reference point, a near vision area comprising a near vision reference point and, positioned in between, a progressive area comprising a center point of the lens, wherein the gradient of the surface refractive force or of the mean sphere is almost 0 along the principal meridian of progression between the level of the far vision reference point and the level of the center point. This embodiment, for example of a constancy of the medium surface-related refractive value along the principal meridian of progression between a height of 8 mm and 4 mm with respect to the geometric middle of the degree forming the origin of a coordinate system used herein, leads to the wearer practically not being subject to any disturbance, when he only to a minor extent lowers the eyes when vision in the distance. The design proposed here, significantly, is suited for spectacle wearers which are already used to varifocal lenses, and therefore tend more towards eye movement than to a head movement.

A preferred embodiment of a progressive varifocal lens which may be a component of a whole lens family or also be an individually manufactured varifocal lens, has a far vision area comprising a far vision reference point, a near vision area comprising a near vision reference point and an intermediate progressive area comprising a center point of the lens, wherein the gradient of the surface-related refractive force, along the main progression meridian, between a first level in the interval between the far vision reference point and the center point and the level of the near vision reference point satisfies a mathematical function $D(y)$ which obeys the following conditions: it has local extrema at the first level and the level of the near vision reference point, and comprises exactly one point of inflection in the open interval between the first level and the near vision reference point, wherein the proceeding of the progression, which means the function $D(y)$ substantially obeys an even power of a trigonometric function, especially a sine square function in the interval 0 to $\pi/2$. To be stated differently, as has been found out by the applicant, it has shown to be especially advantageous, if the proceeding results in a varifocal lens which is comfortable to wear, especially in a physiological context, in case the progression is embodied accordingly, irrespective the question whether it is already chosen as sine square function or another even power of a trigonometric function when designing.

Although up to now no examinations have become known, whereupon physiologically an eye movement would result which leads to a main vision line or a main progression meridian, could be determined of an obeying even power of a trigonometric function, especially a sine square function in the interval 0 to $\pi/2$, the applicant has noted that the shaping of a main vision line or a principal meridian of progression may be especially easily constituted, as far as production technology is concerned, may be mathematically especially well handled and is extremely comfortable to the wearer of a varifocal lens, so that in extremely surprising manner a varifocal lens can be determined as a component of a lens family or as an individual lens, wherein the principal meridian of progression may be determined as a respective function of the y coordinate, or obeys such a function, respectively.

Now, as already stated, at the point in time of the present invention could not yet be concludingly clarified, why especially an even power of a trigonometric function leads to such especially advantageous embodiments, but it is assumed that it is not without importance that an even power of a trigonometric function may be especially easily scaled and adapted to a suitable interval of values, obeys good mathematical differentiation conditions and continuity conditions, due to the/its nature may easily be transformed by using respective known mathematical theorems, and to the one hand, by means of the local approximation to circle sections can especially well take care of the complex surface structure to be applied here, while at the same time also the angular related dependency within the framework of beam guidance optics is taken care of.

In this context, it shall further be noted that by means of a respective setting into relation of the geometric proceeding of the principal meridian of progression on the lens, and the intended variation of addition, respectively applying an even power of a trigonometric function, a helix-like structure may be constituted and also maybe mathematically handled, since, as apparent to the skilled artisan, to the one hand the proceeding of progression leads to a respective proceeding in the y/z plane, while the definition of the form of the principal meridian of progression leads to a respective shaping in the x/y plane.

Figure 2:
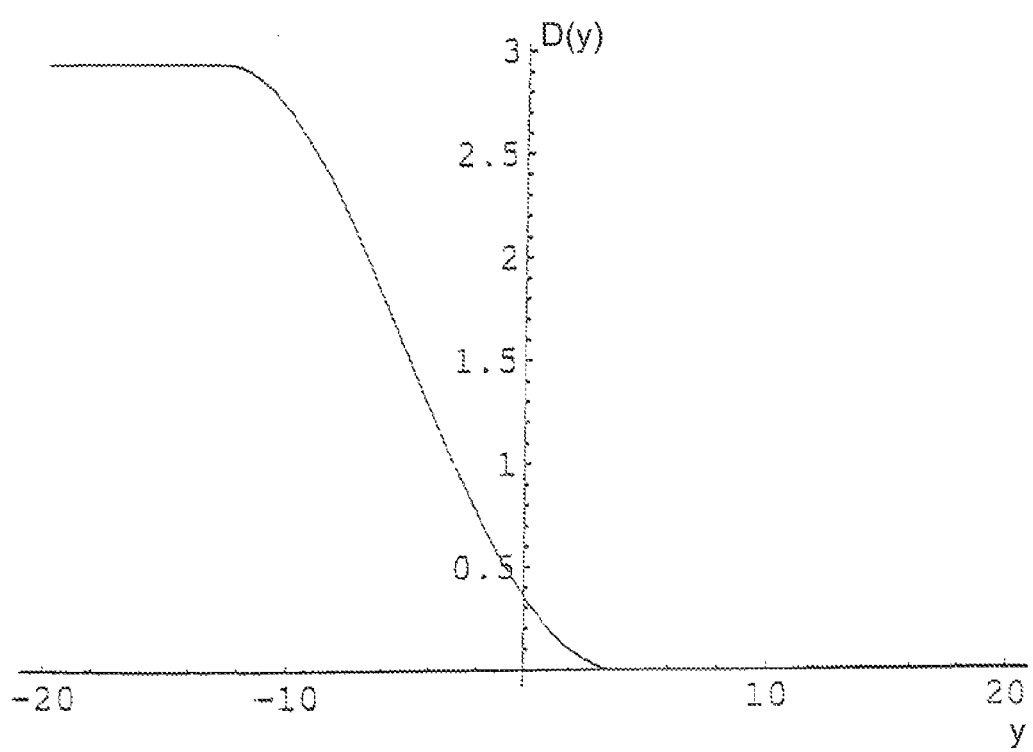
FIGS. 2 to 4 represent different proceedings of the principal meridian of progression in a projection view, wherein one lens respectively represents a sphere of −2 diopters and addition 2.0, a sphere of 0 diopters and an addition of 1, and a sphere of 0 diopters and an addition of 2.0.
Figure 3:
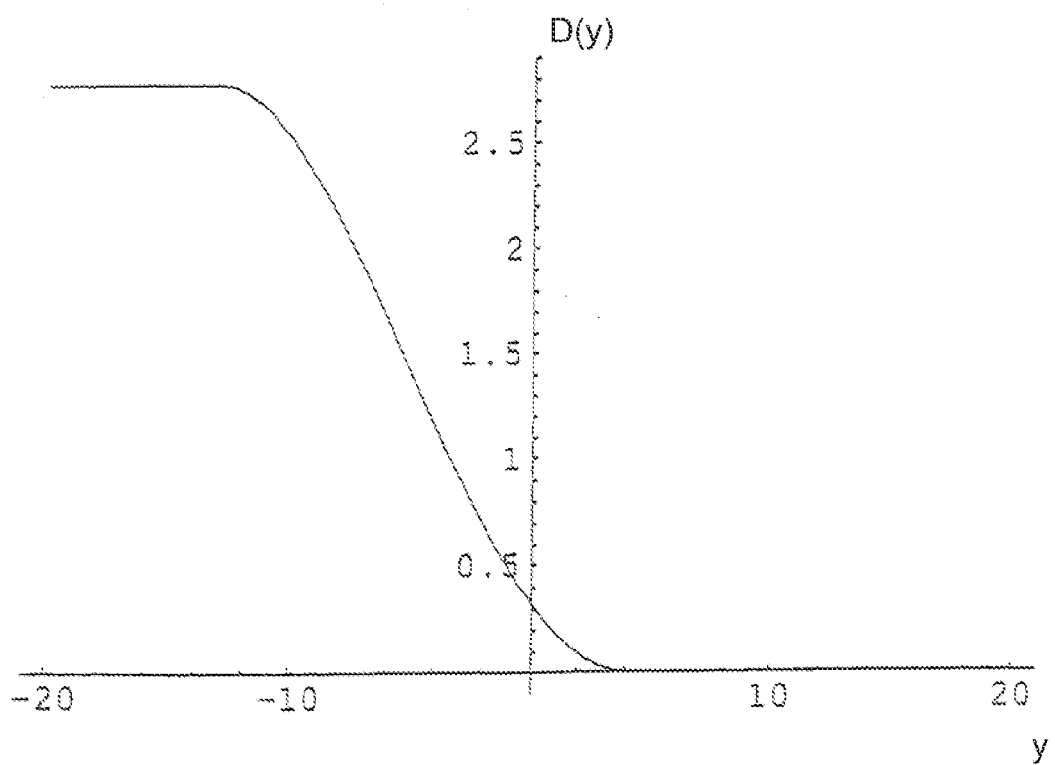
Figure 4:
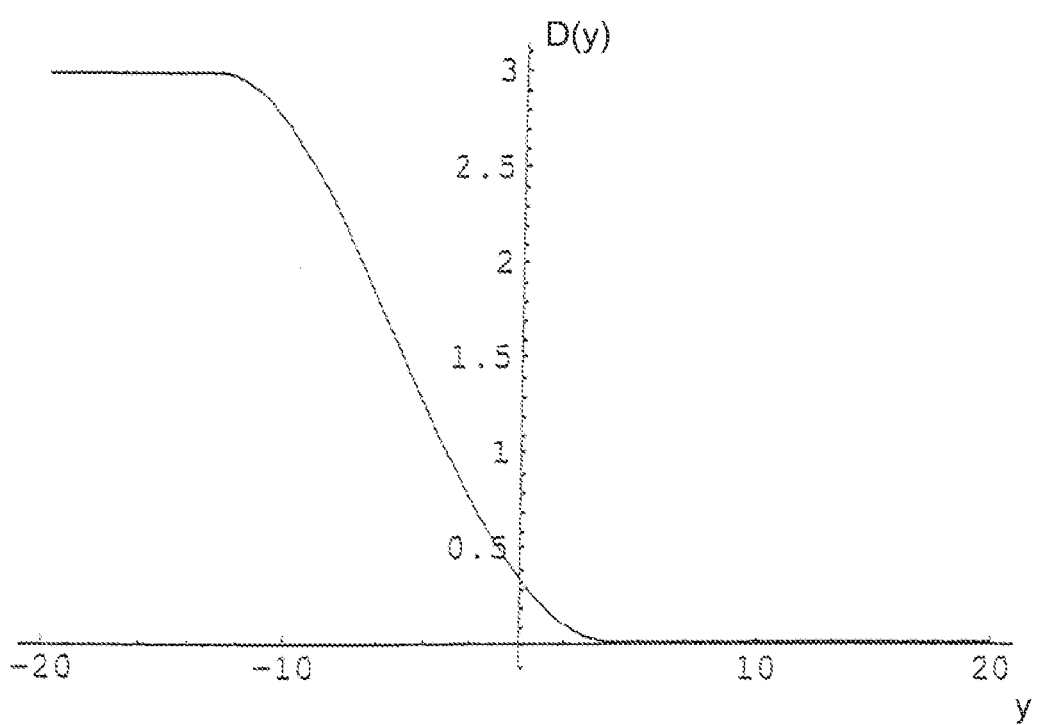

The invention subsequently shall additionally be explained referring to the graphs, accompanying as drawings, wherein FIG. 1 represents a preferred proceeding of effect for a lens having a sphere of +2 diopters and an addition of 2.5, the FIGS. 2 to 4 represent different proceedings of the principal meridian of progression in a projection view, wherein one lens respectively represents a sphere of −2 diopters and addition 2.0, a sphere of 0 diopters and an addition of 1, and a sphere of 0 diopters and an addition of 2.0.

As results from the graphs, especially in FIG. 1 is shown the harmonic proceeding in connection to the far vision area and the near vision area, respectively, as well as the intended configuration having only one point of inflection. From the graph of FIG. 1, especially impressively the correspondence with an even power of a trigonometric function may be recognized, of course after respective scaling and adaptation to the range of values.

As results clearly from the FIGS. 2 to 4, the proceeding of the principal meridian of progression clearly obeys an even power of a trigonometric function, again scaled accordingly and adapted with respect to range of values. The skilled artisan will notice that when choosing even powers, the near vision area and the far vision area may be approximated in mutual relation to each other, but while maintaining continuous conditions of continuity and the presence of only one point of inflection. It is to be noted, that in all shown graphs the design resorts to a sine square function.

Although the present invention has been completely described and explained above, the skilled artisan should notice that the most various changes and modifications within the framework of the claims are possible. Essential for the invention is in the end the use or the presence, respectively, of progression proceedings and/or principal meridian of progression proceedings, which obey an even power of a trigonometric function at least for a relevant part of the progression range.

The invention claimed is:

1. A method for creating a progressive varifocal lens having a far vision area, a near vision area and an intermediate progression area, comprising the steps of:
    a) determining the x and y coordinates of a first point in the closed interval between a far vision reference point of the far vision area and a center point;
    b) determining the x and y coordinates of a second point as the near vision reference point of the near vision area;
    c) determining of a mathematical function D(y) obeying the following conditions:
    I) it contains the first point as local extremum;
    II) it contains the second point as local extremum; and
    III) in the open interval between the first and second points, it contains precisely one point of inflection;
    d) distributing the addition according to the function D(y) along a principal meridian of progression connecting the first and second points; and
    e) forming the varifocal lens,
    wherein the function D(y) between the first point and the second point substantially obeys an even power of a trigonometric function, especially a $Sin^2$ function of the interval $[0, \pi/2]$.

2. A method according to claim 1, wherein a means sphere gradient is approximately zero in the interval between the far vision reference point of the far vision area and the center point.

3. A method according to claim 1, wherein the x coordinate in the step a) and/or in the step b) is determined on the basis of the x coordinate of the step b) and/or of the step a), respectively, and depending on physiological data of the wearer.

4. A method according to claim 1, wherein the x coordinates of the line connecting the first and second point are determined using an equation based on an even power of a trigonometric function, especially a $Sin^2$ function, in the interval $[0, \pi/2]$ and containing physiological data of the wearer as parameters.

5. A method according to claim 3, wherein the physiological data of the wearer used as parameters comprise the pupils' distance and/or a turning point vertex distance.

6. A method according to claim 1, wherein the y coordinates of the first and/or the second point are determined taking into consideration a turning point, vertex distance and/or the ratio of eye movement to head movement of the wearer when changing between far vision and near vision.

7. A progressive varifocal lens, having a far vision area comprising a far vision reference point, a near vision area comprising a near vision reference point and an intermediate progression area comprising a center point of the lens, wherein a means sphere gradient along a principal meridian of progression between a first level in the interval between the far vision reference point and the center point and the level of the near vision reference point obeys a mathematical function D(y) obeying the following conditions:
    (I) it has a local extremum at the first level;
    (II) it has a local extremum at the level of the near vision reference point; and
    (III) it comprises precisely one point of inflection in the open interval between the first level and the near vision reference point;
    wherein the function D(y) between the first point and the second point substantially obeys an even power of a trigonometric function, especially a $Sin^2$ function, in the interval $[0, \pi/2]$.

8. A progressive varifocal lens having a far vision area comprising a far vision reference point, a near vision area comprising a near vision reference point and an intermediate progression area comprising a center point of the lens, wherein a principal meridian of progression proceeding through the near vision reference point and the far vision reference point between a first level in the interval between the far vision reference point and the center point and the level of the near vision reference point obeys a mathematical function M(y), wherein the function M(y) between the first point and the second point substantially obeys an even power of a trigonometric function, especially a $Sin^2$ function, in the interval $[0, \pi/2]$.

9. A progressive varifocal lens, manufactured according to a method according to claim 1.

10. A method according to claim 4, wherein the physiological data of the wearer used as parameters comprise the pupils' distance and/or a turning point vertex distance.

* * * * *